United States Patent
Lin et al.

(10) Patent No.: US 10,009,595 B2
(45) Date of Patent: Jun. 26, 2018

(54) IMAGE CALIBRATION SYSTEM AND CALIBRATION METHOD OF A STEREO CAMERA

(71) Applicant: Etron Technology, Inc., Hsinchu (TW)

(72) Inventors: Wen-Kuo Lin, Taipei (TW); Ming-Che Ho, Kaohsiung (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days. days.

(21) Appl. No.: 14/849,618

(22) Filed: Sep. 10, 2015

(65) Prior Publication Data
US 2016/0073092 A1 Mar. 10, 2016

Related U.S. Application Data

(60) Provisional application No. 62/048,272, filed on Sep. 10, 2014.

(51) Int. Cl.
*H04N 13/02* (2006.01)
*G06T 7/80* (2017.01)

(52) U.S. Cl.
CPC ........... *H04N 13/0246* (2013.01); *G06T 7/85* (2017.01); *H04N 13/0239* (2013.01); *G06T 2207/10021* (2013.01)

(58) Field of Classification Search
CPC ........... H04N 13/0246; H04N 13/0239; H04N 13/0296; H04N 17/00; H04N 17/02; H04N 7/14; H04N 7/18; H04N 9/47; H04N 9/28; G06T 7/002; G06T 2207/10021

USPC ............................. 348/187, 188, 46, 175, 176
See application file for complete search history.

(56) References Cited

U.S. PATENT DOCUMENTS

| | | | | |
|---|---|---|---|---|
| 7,554,575 B2* | 6/2009 | Zandifar | ............... | G06T 7/0018 348/187 |
| 8,208,716 B2* | 6/2012 | Choi | ....................... | G06T 7/593 382/106 |
| 8,401,241 B2* | 3/2013 | Chandraker | ............. | G06K 9/32 345/419 |
| 8,743,214 B2* | 6/2014 | Grossmann | .......... | H04N 17/002 348/188 |
| 8,773,540 B2* | 7/2014 | Friend | .................... | H04N 17/02 348/188 |
| 2004/0189805 A1 | 9/2004 | Seitz | | |

FOREIGN PATENT DOCUMENTS

| | | |
|---|---|---|
| CN | 101052121 A | 10/2007 |
| CN | 103813151 A | 5/2014 |
| JP | 201492461 | 5/2014 |

* cited by examiner

*Primary Examiner* — Trang U Tran
(74) *Attorney, Agent, or Firm* — Winston Hsu

(57) ABSTRACT

A calibration method of a stereo camera includes transmitting a group of system parameters of the stereo camera to a server; downloading calibration pattern corresponding to the group of system parameters from the server; calculating a plurality of camera calibration parameters corresponding to the stereo camera according to the calibration pattern; and executing an image rectification operation on a left eye image capture unit and a right eye image capture unit of the stereo camera according to the plurality of camera calibration parameters, respectively.

20 Claims, 4 Drawing Sheets

IMAGE CALIBRATION SYSTEM AND CALIBRATION METHOD OF A STEREO CAMERA

CROSS REFERENCE TO RELATED APPLICATIONS

This application claims the benefit of U.S. Provisional Application No. 62/048,272, filed on Sep. 10, 2014 and entitled "Stereo Camera Calibration," the contents of which are incorporated herein by reference.

BACKGROUND OF THE INVENTION

1. Field of the Invention

The present invention relates to an image calibration system and a calibration method of a stereo camera, and particularly to an image calibration system and a calibration method of a stereo camera that can utilize a processor of the stereo camera to download a calibration pattern corresponding to system parameters of the stereo camera from a server located on the Internet to compensate decrease of structure and the optical accuracy of the stereo camera.

2. Description of the Prior Art

To make a stereo camera generate stereo images with good quality, the stereo camera usually needs high structure and optical accuracy, wherein before the stereo camera is shipped, a manufacturer of the stereo camera will maintain the above mentioned high structure and optical accuracy needed by the stereo camera during a manufacturing process of the stereo camera. However, after the stereo camera is shipped, the above mentioned high structure and optical accuracy needed by the stereo camera may not be maintained because of a utilization environment or a utilization way of the stereo camera (e.g. the utilization environment or the utilization way of the stereo camera can make positions or Image capture angles of left/right eye image capture units of the stereo camera be changed). Therefore, after the stereo camera is shipped and operated by a user for a period of time, the stereo camera needs to be executed an image rectification operation to compensate decrease of the structure and optical accuracy of the stereo camera.

However, when the stereo camera needs to be executed the image rectification operation, the user needs to return the stereo camera to the manufacturer of the stereo camera to let the manufacturer of the stereo camera execute the image rectification operation on the stereo camera. Thus, the prior art is inconvenient, time consuming, and needs additional cost.

SUMMARY OF THE INVENTION

An embodiment of the present invention provides a calibration method of a stereo camera, wherein the stereo camera includes a left eye image capture unit and a right eye image capture unit. The calibration method includes transmitting a group of system parameters of the stereo camera to a server; downloading a calibration pattern corresponding to the group of system parameters from the server; calculating a plurality of camera calibration parameters corresponding to the stereo camera according to the calibration pattern; and executing an image rectification operation on the left eye image capture unit and the right eye image capture unit according to the plurality of camera calibration parameters, respectively.

Another embodiment of the present invention provides an image calibration system. The image calibration system includes a stereo camera. The stereo camera has a left eye image capture unit, a right eye image capture unit, and a processor, wherein the processor transmits a group of system parameters of the stereo camera to a server, and downloads a calibration pattern corresponding to the group of system parameters to a display from the server after the server receives the group of system parameters. The processor or the server calculates a plurality of camera calibration parameters corresponding to the stereo camera according to the calibration pattern, and the processor executes an image rectification operation on the left eye image capture unit and the right eye image capture unit according to the plurality of camera calibration parameters, respectively.

Another embodiment of the present invention provides an image calibration system. The image calibration system includes a stereo camera. The stereo camera has a left eye image capture unit, a right eye image capture unit, and a processor, wherein the processor transmits a group of system parameters of the stereo camera and characteristic parameters of a display to a server, and downloads a calibration pattern corresponding to the group of system parameters and the characteristic parameters of the display from the server to the display after the server receives the group of system parameters and the characteristic parameters of the display. When the calibration pattern displayed by the display is located within an image calibration range of the stereo camera, the processor or the server calculates a plurality of camera calibration parameters corresponding to the stereo camera according to the calibration pattern, and the processor executes an image rectification operation on the left eye image capture unit and the right eye image capture unit according to the plurality of camera calibration parameters, respectively.

The present invention provides an image calibration system and a calibration method of a stereo camera. Because after the stereo camera is shipped and operated by a user for a period of time, structure and optical accuracy of the stereo camera will be reduced because of a utilization environment, a utilization way, and/or a shipped situation of the stereo camera, or degradation of materials of the stereo camera, the image calibration system and the calibration method provided by the present invention are applied to the above mentioned situation corresponding to the stereo camera (that is, after the stereo camera is shipped and operated by the user for a period of time). Because the present invention utilizes a processor of the stereo camera to download a calibration pattern corresponding to system parameters of the stereo camera, or corresponding to the system parameters of the stereo camera and characteristic parameters of a first display from a server located on the Internet to compensate decrease of the structure and optical accuracy of the stereo camera, compared to the prior art, the present invention is more convenient, lower cost, and without professional skills for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
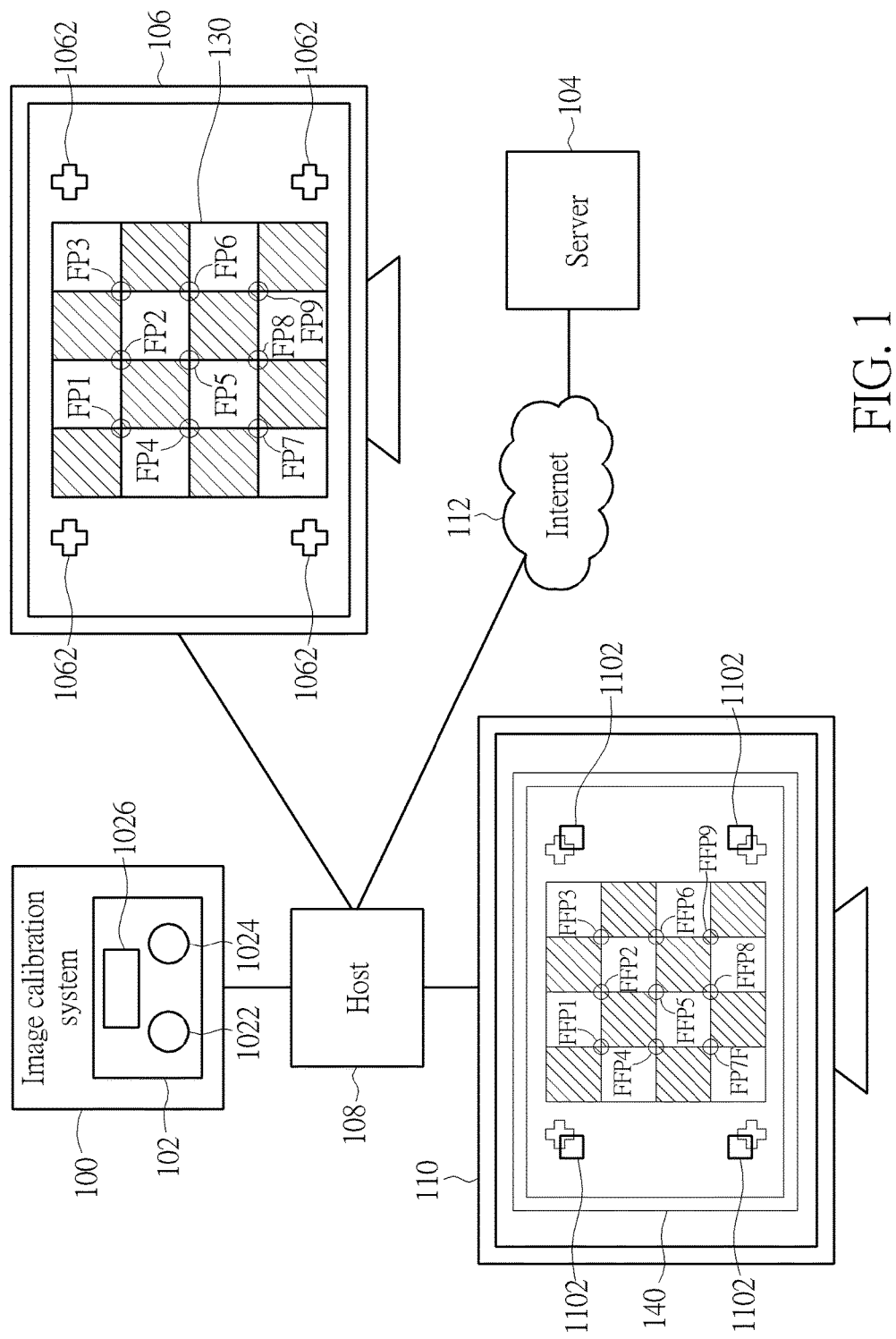
FIG. 1 is a diagram illustrating an image calibration system, a server, a first display, a host, a second display, and the Internet.
Figure 2:
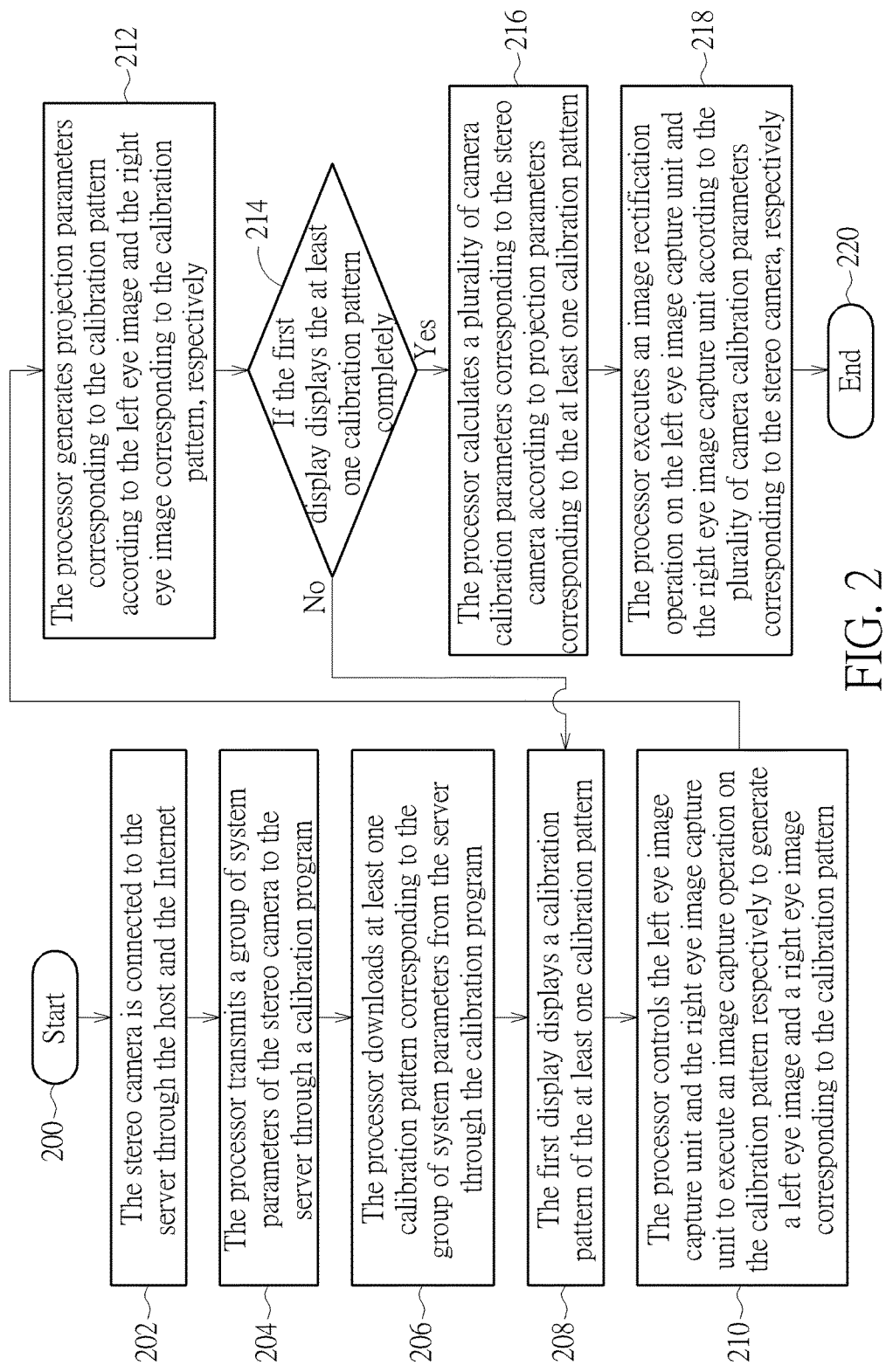
FIG. 2 is a flowchart illustrating a calibration method of a stereo camera according to a first embodiment of the present invention.

Please refer to FIG. 1. FIG. 1 is a diagram illustrating an image calibration system 100, a server 104, a first display 106, a host 108, a second display 110, and the Internet 112, wherein a stereo camera 102 is included in the image calibration system 100, and the stereo camera 102 includes a left eye image capture unit 1022, a right eye image capture unit 1024, and a processor 1026. Please refer to FIG. 2. FIG. 2 is a flowchart illustrating a calibration method of a stereo camera according to a first embodiment of the present invention. The calibration method in FIG. 2 is illustrated using the image calibration system 100, the server 104, the first display 106, the host 108, the second display 110, and the Internet 112 in FIG. 1. Detailed steps are as follows:

Step 200: Start.

Step 202: The stereo camera 102 is connected to the server 104 through the host 108 and the Internet 112.

Step 204: The processor 1026 transmits a group of system parameters of the stereo camera 102 to the server 104 through a calibration program.

Step 206: The processor 1026 downloads at least one calibration pattern corresponding to the group of system parameters from the server 104 through the calibration program.

Step 208: The first display 106 displays a calibration pattern of the at least one calibration pattern.

Step 210: The processor 1026 controls the left eye image capture unit 1022 and the right eye image capture unit 1024 to execute an image capture operation on the calibration pattern respectively to generate a left eye image and a right eye image corresponding to the calibration pattern.

Step 212: The processor 1026 generates projection parameters corresponding to the calibration pattern according to the left eye image and the right eye image corresponding to the calibration pattern, respectively.

Step 214: If the first display 106 displays the at least one calibration pattern completely; if yes, go to Step 216; if no, go to Step 208.

Step 216: The processor 1026 calculates a plurality of camera calibration parameters corresponding to the stereo camera 102 according to projection parameters corresponding to the at least one calibration pattern.

Step 218: The processor 1026 executes an image rectification operation on the left eye image capture unit 1022 and the right eye image capture unit 1024 according to the plurality of camera calibration parameters corresponding to the stereo camera 102, respectively.

Step 220: End.

After the stereo camera 102 is shipped and operated by a user for a period of time, structure and optical accuracy of the stereo camera 102 will be reduced because of a utilization environment, a utilization way, and/or a shipped situation of the stereo camera 102, or degradation of materials of the stereo camera 102. Therefore, the stereo camera 102 needs to be executed the image rectification operation to compensate decrease of the structure and optical accuracy of the stereo camera 102. As shown in FIG. 1, in Step 202, the stereo camera 102 is connected to the server 104 through the host 108 and the Internet 112, and the first display 106 is coupled to the host 108. In Step 204, the processor 1026 transmits the group of system parameters of the stereo camera 102 to the server 104 through the calibration program, wherein the calibration program is built in the stereo camera 102, or the processor 1026 downloads the calibration program from the server 104 when the stereo camera 102 is connected to the server 104 through the host 108 and the Internet 112. In addition, the group of system parameters of the stereo camera 102 includes at least one of a lens focal length, an optical axis, and a lens deformation corresponding to the left eye image capture unit 1022, a lens focal length, an optical axis, and a lens deformation corresponding to the right eye image capture unit 1024, a distance between the left eye image capture unit 1022 and the right eye image capture unit 1024, a number of a plurality of sensing rows of the left eye image capture unit 1022 and a number of a plurality of sensing rows of the right eye image capture unit 1024, a number of sensing pixels included in each of the plurality of sensing rows of the left eye image capture unit 1022 and the plurality of sensing rows of the right eye image capture unit 1024, and a size of each of sensing pixels included in each of the plurality of sensing rows of the left eye image capture unit 1022 and the plurality of sensing rows of the right eye image capture unit 1024. But, the present invention is not limited to the above mentioned group of system parameters of the stereo camera 102. In addition, in another embodiment of the present invention, in Step 204, the processor 1026 transmits the group of system parameters of the stereo camera 102 and characteristic parameters of the first display 106 to the server 104 through the calibration program, wherein the characteristic parameters of the first display 106 include at least one of a horizontal resolution of the first display 106, a vertical resolution of the first display 106, and a profile and a size of the first display 106. But, the present invention is not limited to the above mentioned characteristic parameters of the first display 106.

In Step 206, the processor 1026 can download the at least one calibration pattern corresponding to the group of system parameters to the host 108 from the server 104 through the calibration program. In addition, in another embodiment of the present invention, because in Step 204, the processor 1026 can transmit the group of system parameters of the stereo camera 102 and the characteristic parameters of the first display 106 to the server 104 through the calibration program, in Step 206, the processor 1026 can download the at least one calibration pattern corresponding to the group of system parameters and the characteristic parameters of the first display 106 to the host 108 from the server 104 through the calibration program. In Step 208, after the at least one calibration pattern corresponding to the group of system parameters is downloaded to the host 108, the host 108 can utilize the first display 106 to display the at least one calibration pattern, wherein the first display 106 has four position markers 1062. But, the present invention is not limited to the first display 106 having the position markers 1062. For example, as shown in FIG. 1, the first display 106 displays a calibration pattern 130 of the at least one calibration pattern. In Step 210, when the first display 106 displays the calibration pattern 130, the processor 1026 can control the left eye image capture unit 1022 and the right eye image capture unit 1024 to execute the image capture operation on the calibration pattern 130 respectively to generate a left eye image and a right eye image corresponding to the calibration pattern 130, and the left eye image and the right eye image corresponding to the calibration pattern 130 are displayed on the second display 110 through the host 108. For example, as shown in FIG. 1, the second display 110 displays a left eye image 140 corresponding to the calibration pattern 130. In addition, when the second display 110 displays the left eye image 140 corresponding to the calibration pattern 130, the processor 1026 can utilize 4 alignment markers 1102 included in a viewfinder (not shown in FIG. 1) of the second display 110 and images in the left eye image 140 corresponding to the 4 position markers 1062 to make the calibration pattern 130 be located within an image calibration range of the stereo camera 102, wherein a number of alignment markers of the second display 110 is equal to a number of position markers of the first display 106.

In Step 212, the processor 1026 can generate projection parameters corresponding to the calibration pattern 130 according to the left eye image 140 and the right eye image corresponding to the calibration pattern 130, respectively, wherein in one embodiment of the present invention, the present invention utilizes a plurality of feature points of the left eye image 140 and the right eye image corresponding to the calibration pattern 130 to generate the projection parameters corresponding to the calibration pattern 130. But, the present invention is not limited to the projection parameters corresponding to the calibration pattern 130 corresponding to the plurality of feature points of the left eye image 140 and the right eye image. As shown in FIG. 1, the calibration pattern 130 has 9 feature points FP1-FP9. But, the present invention is not limited to a profile and a predetermined pattern of calibration pattern 130 shown in FIG. 1, and is also not limited to the calibration pattern 130 having the 9 feature points FP1-FP9. That is to say, the calibration pattern 130 can have a plurality of feature points. In addition, as shown in FIG. 1, because the calibration pattern 130 has the 9 feature points FP1-FP9, the left eye image 140 generated by the left eye image capture unit 1022 also has 9 first feature points FFP1-FFP9 and the right eye image corresponding to the calibration pattern 130 generated by the right eye image capture unit 1024 also has 9 second feature points. Because the left eye image 140 corresponding to the calibration pattern 130 has the 9 first feature points FFP1-FFP9 and the right eye image corresponding to the calibration pattern 130 also has the 9 second feature points, the processor 1026 can extract the 9 first feature points FFP1-FFP9 corresponding to the 9 feature points FP1-FP9 from the left eye image 140, and extract the 9 second feature points corresponding to the 9 feature points FP1-FP9 from the right eye image. In Step 214, after the first display 106 displays at least one calibration pattern completely, the processor 1026 can generate the projection parameters corresponding to the at least one calibration pattern. In Step 216, after the processor 1026 generates the projection parameters corresponding to the at least one calibration pattern, the processor 1026 can calculate the plurality of camera calibration parameters corresponding to the stereo camera 102 according to the projection parameters corresponding to the at least one calibration pattern. But, in another embodiment of the present invention, after the processor 1026 generates the projection parameters corresponding to the at least one calibration pattern, the server 104 can calculate the plurality of camera calibration parameters corresponding to the stereo camera 102 according to the projection parameters corresponding to the at least one calibration pattern. In Step 218, after the processor 1026 calculates the plurality of camera calibration parameters corresponding to the stereo camera 102, the processor 1026 executes the image rectification operation on the left eye image capture unit 1022 and the right eye image capture unit 1024 according to the plurality of camera calibration parameters corresponding to the stereo camera 102, respectively. That is to say, the structure and optical accuracy of the stereo camera 102 will be reduced because of the utilization environment, the utilization way, and/or the shipped situation of the stereo camera 102, or degradation of materials of the stereo camera 102, so the processor 1026 can rectify the left eye image generated by the left eye image capture unit 1022 and the right eye image generated by the right eye image capture unit 1024 according to the plurality of camera calibration parameters corresponding to the stereo camera 102, respectively. In addition, a purpose of the image rectification operation makes the 9 first feature points FFP1-FFP9 of the left eye image 140 generated by the left eye image capture unit 1022 align the 9 second feature points of the right eye image generated by the right eye image capture unit 1024 (e.g. row alignment between the left eye image 140 and the right eye image) to save memory space needed by following processes of the processor 1026, wherein the row alignment means that on an image plane, each of the 9 first feature points FFP1-FFP9 of the left eye image 140 and a corresponding feature point of the 9 second feature points of the right eye image are located on the same Y axis (when the left eye image capture unit 1022 and the right eye image capture unit 1024 are placed on the same horizontal placement). In another embodiment aligning the 9 second feature points of the right eye image generated by the right eye image capture unit 1024 could be column alignment when the left eye image capture unit 1022 and the right eye image capture unit 1024 are placed on the same vertical placement.

Figure 3:
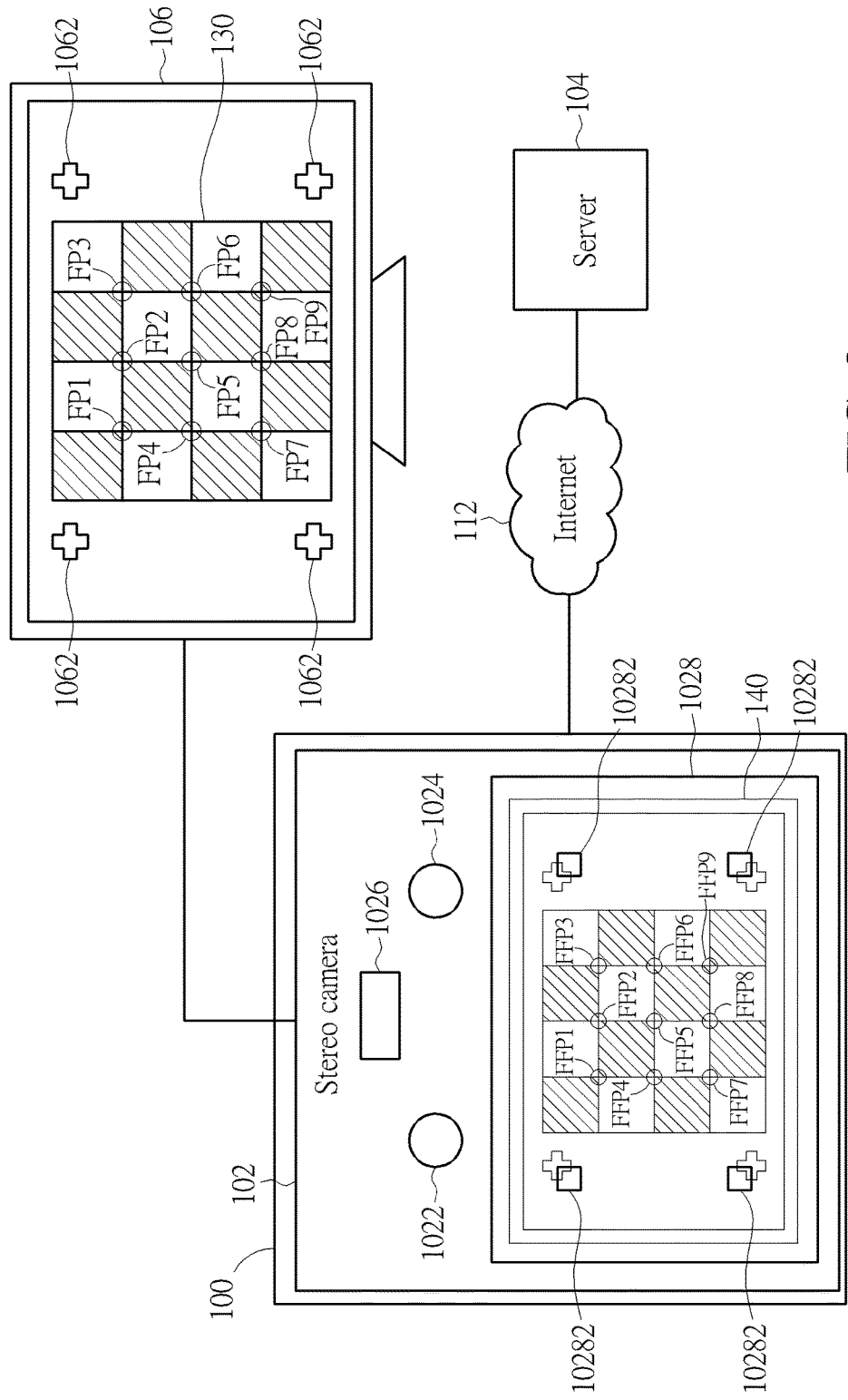
FIG. 3 is a diagram illustrating the stereo camera being connected to the server through the Internet, the first display being directly coupled to the stereo camera, and the stereo camera further including the viewfinder.

In addition, in another embodiment of the present invention, the stereo camera 102 is connected to the server 104 through the Internet 112, and the first display 106 is directly coupled to the stereo camera 102, wherein the stereo camera 102 further includes a viewfinder 1028 (as shown in FIG. 3). Because the stereo camera 102 is connected to the server 104 through the Internet 112, and the first display 106 is directly coupled to the stereo camera 102, in Step 206, the processor 1026 can download the at least one calibration pattern corresponding to the group of system parameters to the stereo camera 102 from the server 104 through the calibration program; in Step 208, the processor 1026 can utilize the first display 106 to display the at least one calibration pattern; and in Step 210, when the first display 106 displays the calibration pattern 130, the processor 1026 can control the left eye image capture unit 1022 and the right eye image capture unit 1024 to execute the image capture operation on the calibration pattern 130 respectively to generate the left eye image and the right eye image corresponding to the calibration pattern 130, and the left eye image and the right eye image corresponding to the calibration pattern 130 are displayed on the viewfinder 1028. For example, in FIG. 3, the viewfinder 1028 displays the left eye image 140 corresponding to the calibration pattern 130. In addition, when the viewfinder 1028 displays the left eye image 140 corresponding to the calibration pattern 130, the processor 1026 can utilize 4 alignment markers 10282 of the viewfinder 1028 and images in the left eye image 140 corresponding to the 4 position markers 1062 to make the calibration pattern 130 be located within the image calibration range of the stereo camera 102, wherein a number of alignment markers of the viewfinder 1028 is equal to the number of position markers of the first display 106. In addition, subsequent operational principles of the embodiment in FIG. 3 are the same as those of the embodiment in FIG. 1, so further description thereof is omitted for simplicity.

Figure 4:
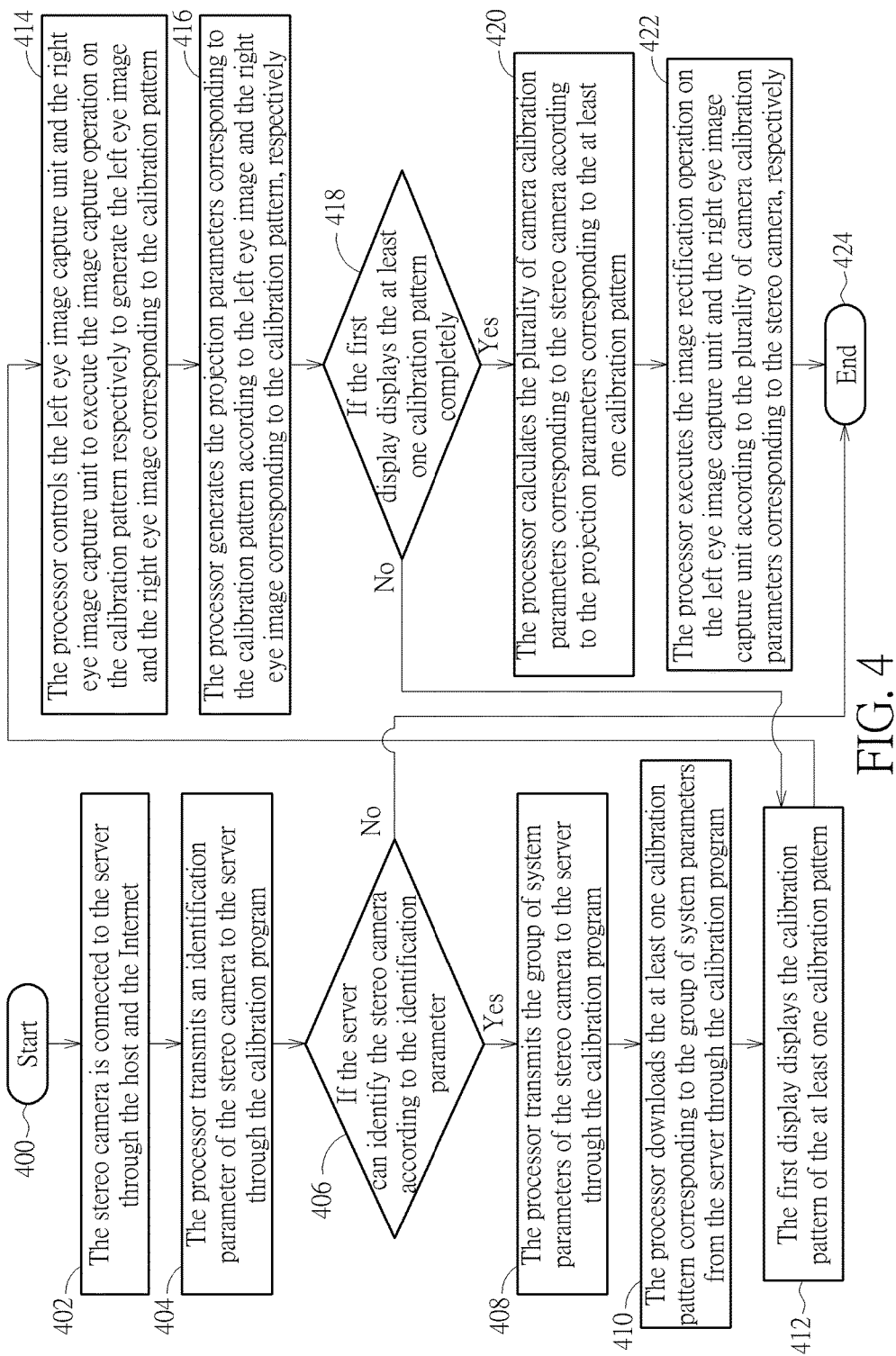
FIG. 4 is a flowchart illustrating a calibration method of a stereo camera according to a second embodiment of the present invention.

Please refer to FIGS. 1, 4. FIG. 4 is a flowchart illustrating a calibration method of a stereo camera according to a second embodiment of the present invention. The calibration method in FIG. 4 is illustrated using the image calibration system 100, the server 104, the first display 106, the host 108, the second display 110, and the Internet 112 in FIG. 1. Detailed steps are as follows:

Step 400: Start.

Step 402: The stereo camera 102 is connected to the server 104 through the host 108 and the Internet 112.

Step 404: The processor 1026 transmits an identification parameter of the stereo camera 102 to the server 104 through the calibration program.

Step 406: If the server 104 can identify the stereo camera 102 according to the identification parameter; if yes, go to Step 408; if no, go to Step 424.

Step 408: The processor 1026 transmits the group of system parameters of the stereo camera 102 to the server 104 through the calibration program.

Step 410: The processor 1026 downloads the at least one calibration pattern corresponding to the group of system parameters from the server 104 through the calibration program.

Step 412: The first display 106 displays the calibration pattern of the at least one calibration pattern.

Step 414: The processor 1026 controls the left eye image capture unit 1022 and the right eye image capture unit 1024 to execute the image capture operation on the calibration pattern respectively to generate the left eye image and the right eye image corresponding to the calibration pattern.

Step 416: The processor 1026 generates the projection parameters corresponding to the calibration pattern according to the left eye image and the right eye image corresponding to the calibration pattern, respectively.

Step 418: If the first display 106 displays the at least one calibration pattern completely; if yes, go to Step 420; if no, go to Step 412.

Step 420: The processor 1026 calculates the plurality of camera calibration parameters corresponding to the stereo camera 102 according to the projection parameters corresponding to the at least one calibration pattern.

Step 422: The processor 1026 executes the image rectification operation on the left eye image capture unit 1022 and the right eye image capture unit 1024 according to the plurality of camera calibration parameters corresponding to the stereo camera 102, respectively.

Step 424: End.

Differences between the embodiment in FIG. 4 and the embodiment in FIG. 2 are that in Step 404, the processor 1026 can transmit the identification parameter of the stereo camera 102 to the server 104 through the calibration program; and in Step 406, the server 104 can identify whether the stereo camera 102 is a fake according to the identification parameter. That is to say, when the stereo camera 102 is a fake, the server 104 cannot identify the stereo camera 102 according to the identification parameter. Meanwhile, the server 104 can disconnect with the stereo camera 102. After the server 104 disconnects with the stereo camera 102, the stereo camera 102 cannot utilize the calibration method provided by the present invention to execute the image rectification operation to compensate decrease of the structure and optical accuracy of the stereo camera 102. In addition, subsequent operational principles of the embodiment in FIG. 4 are the same as those of the embodiment in FIG. 2, so further description thereof is omitted for simplicity.

To sum up, after the stereo camera is shipped and operated by the user for a period of time, the structure and optical accuracy of the stereo camera will be reduced because of the utilization environment, the utilization way, and/or the shipped situation of the stereo camera, or degradation of materials of the stereo camera, so the image calibration system and the calibration method of a stereo camera provided by the present invention are applied to the above mentioned situation corresponding to the stereo camera (that is, after the stereo camera is shipped and operated by the user for a period of time). Because the present invention utilizes the processor of the stereo camera to download the at least one calibration pattern corresponding to the system parameters of the stereo camera, or corresponding to the system parameters of the stereo camera and the characteristic parameters of the first display from the server located on the Internet to compensate decrease of the structure and optical accuracy of the stereo camera, compared to the prior art, the present invention is more convenient, lower cost, and without professional skills for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method of a stereo camera, wherein the stereo camera comprises a first image capture unit and a second image capture unit, the calibration method comprising:

transmitting a group of default system parameters of the stereo camera from the stereo camera to a server;

downloading a calibration pattern corresponding to the group of default system parameters from the server;

calculating a plurality of camera calibration parameters corresponding to the stereo camera according to the calibration pattern; and executing an image rectification operation on the first image capture unit and the second image capture unit according to the plurality of camera calibration parameters, respectively, wherein the server does not change the group of default system parameters transmitted from the stereo camera to the server during the image rectification operation being executed on the first image capture unit and the second image capture unit, and the group of default system parameters is not changed with a first image captured by the first capture unit and a second image captured by the second capture unit.

2. The calibration method of claim 1, wherein a processor of the stereo camera transmits the group of default system parameters to the server through a calibration program, and the calibration program is built in the stereo camera, or the processor of the stereo camera downloads the calibration program from the server.

3. The calibration method of claim 1, wherein calculating the plurality of camera calibration parameters corresponding to the stereo camera according to the calibration pattern comprises:

the first image capture unit and the second image capture unit executing an image capture operation on the calibration pattern respectively to generate a first image and a second image corresponding to the calibration pattern when the calibration pattern displayed by a display is located within an image calibration range of the stereo camera;

generating projection parameters corresponding to the calibration pattern according to a first image and a second image corresponding to the calibration pattern, respectively; and calculating the plurality of camera calibration parameters according to the projection parameters corresponding to the calibration pattern.

4. The calibration method of claim 3, wherein the display has at least one position marker, and the processor of the stereo camera utilizes at least one alignment marker of another display and the at least one position marker to make the calibration pattern be located within the image calibration range of the stereo camera.

5. The calibration method of claim 3, wherein the processor of the stereo camera calculates the plurality of camera calibration parameters corresponding to the stereo camera according to the projection parameters corresponding to the calibration pattern.

6. The calibration method of claim 3, wherein the server calculates the plurality of camera calibration parameters corresponding to the stereo camera according to the projection parameters corresponding to the calibration pattern.

7. The calibration method of claim 3, wherein the stereo camera is connected to the server through a host and an Internet, and the display is coupled to the host.

8. The calibration method of claim 3, wherein the stereo camera is connected to the server through an Internet, and the display is coupled to the stereo camera.

9. The calibration method of claim 1, further comprising:
transmitting an identification parameter corresponding to the stereo camera to the server.

10. The calibration method of claim 1, wherein the group of default system parameters comprises at least one of a lens focal length, an optical axis, and a lens deformation corresponding to the first image capture unit, a lens focal length, an optical axis, and a lens deformation corresponding to the second image capture unit, a distance between the first image capture unit and the second image capture unit, a number of a plurality of sensing rows of the first image capture unit and a number of a plurality of sensing rows of the second image capture unit, a number of sensing pixels comprised in each of the plurality of sensing rows of the first image capture unit and the plurality of sensing rows of the second image capture unit, and a size of each of the sensing pixels.

11. The calibration method of claim 1, further comprising:
transmitting default characteristic parameters of a display to the server;
downloading another calibration pattern corresponding to the group of default system parameters and the default characteristic parameters of the display from the server, wherein the display displays the another calibration pattern;
calculating a plurality of camera calibration parameters corresponding to the stereo camera according to the another calibration pattern; and
executing an image rectification operation on the first image capture unit and the second image capture unit according to the plurality of camera calibration parameters, respectively.

12. The calibration method of claim 11, wherein the default characteristic parameters of the display comprise at least one of a horizontal resolution of the display, a vertical resolution of the display, and a profile and a size of the display.

13. An image calibration system, comprising:
a stereo camera having a first image capture unit, a second image capture unit, and a processor, wherein the processor transmits a group of default system parameters of the stereo camera from the stereo camera to a server, and downloads a calibration pattern corresponding to the group of default system parameters to a display from the server after the server receives the group of default system parameters, wherein the group of default system parameters is not changed with a first image captured by the first capture unit and a second image captured by the second capture unit;
wherein the processor or the server calculates a plurality of camera calibration parameters corresponding to the stereo camera according to the calibration pattern, and the processor executes an image rectification operation on the first image capture unit and the second image capture unit according to the plurality of camera calibration parameters, respectively, wherein the server does not change the group of default system parameters transmitted from the stereo camera to the server during the image rectification operation being executed on the first image capture unit and the second image capture unit.

14. The image calibration system of claim 13, wherein the processor transmits the group of default system parameters to the server through a calibration program, and the calibration program is built in the stereo camera, or the processor downloads the calibration program from the server.

15. The image calibration system of claim 13, wherein when the calibration pattern of the calibration pattern displayed by the display is located within an image calibration range of the stereo camera, the first image capture unit and the second image capture unit executes an image capture operation on the calibration pattern respectively to generate a first image and a second image corresponding to the calibration pattern, the processor further generates projection parameters corresponding to the calibration pattern according to a first image and a second image corresponding to the calibration pattern respectively, and the processor or the server calculates the plurality of camera calibration parameters according to the projection parameters corresponding to the calibration pattern.

16. The image calibration system of claim 15, wherein the display has at least one position marker, and the processor of the stereo camera utilizes at least one alignment marker of another display and the at least one position marker to make the calibration pattern be located within the image calibration range of the stereo camera.

17. The image calibration system of claim 13, wherein the stereo camera is connected to the server through a host and an Internet, and the display is coupled to the host.

18. The image calibration system of claim 13, wherein the processor further transmits an identification parameter corresponding to the stereo camera to the server.

19. The image calibration system of claim 13, wherein the stereo camera is connected to the server through an Internet, and the display is coupled to the stereo camera.

20. An image calibration system, comprising:
a stereo camera having a first image capture unit, a second image capture unit, and a processor, wherein the processor transmits a group of default system parameters of the stereo camera and default characteristic parameters of a display from the stereo camera to a server, and downloads a calibration pattern corresponding to the group of default system parameters and the default characteristic parameters of the display from the server to the display after the server receives the group of default system parameters and the default characteristic parameters of the display, wherein the group of default system parameters is not changed with a first image captured by the first capture unit and a second image captured by the second capture unit;

wherein when the calibration pattern displayed by the display is located within an image calibration range of the stereo camera, the processor or the server calculates a plurality of camera calibration parameters corresponding to the stereo camera according to the calibration pattern, and the processor executes an image rectification operation on the first image capture unit and the second image capture unit according to the plurality of camera calibration parameters, respectively, wherein the server does not change the group of default system parameters of the stereo camera and the default characteristic parameters of the display transmitted from the stereo camera to the server during the image rectification operation being executed on the first image capture unit and the second image capture unit.

* * * * *